US010407170B2

(12) United States Patent
Hall et al.

(10) Patent No.: US 10,407,170 B2
(45) Date of Patent: Sep. 10, 2019

(54) APPARATUS CONNECTING ROTARY BLADE UNMANNED AERIAL VEHICLES

(71) Applicants: David R. Hall, Provo, UT (US); Mark Hall, Springville, UT (US); Craig Boswell, Draper, UT (US); Joe Fox, Spanish Fork, UT (US)

(72) Inventors: David R. Hall, Provo, UT (US); Mark Hall, Springville, UT (US); Craig Boswell, Draper, UT (US); Joe Fox, Spanish Fork, UT (US)

( * ) Notice: Subject to any disclaimer, the term of this patent is extended or adjusted under 35 U.S.C. 154(b) by 180 days.

(21) Appl. No.: 15/623,948

(22) Filed: Jun. 15, 2017

(65) Prior Publication Data
US 2018/0362156 A1    Dec. 20, 2018

(51) Int. Cl.
*B64C 37/02*    (2006.01)
*B64C 39/02*    (2006.01)

(52) U.S. Cl.
CPC ............ *B64C 37/02* (2013.01); *B64C 39/024* (2013.01); *B64C 2201/042* (2013.01); *B64C 2201/108* (2013.01); *B64C 2201/128* (2013.01)

(58) Field of Classification Search
CPC . B64C 37/02; B64C 39/024; B64C 2201/042; B64C 2201/108; B64C 2201/128

USPC ........................................................ 701/22, 2
See application file for complete search history.

(56) References Cited

U.S. PATENT DOCUMENTS

2017/0301220 A1* 10/2017 Jarrell ..................... H04W 4/70
2018/0076531 A1*  3/2018 Polehn ............... H01Q 15/0086
2018/0237161 A1*  8/2018 Minnick ................... B64F 5/00

* cited by examiner

*Primary Examiner* — Gertrude Arthur Jeanglaude

(57) ABSTRACT

An apparatus for connecting a number of rotary blade unmanned aerial vehicles (UAVs) is described. The apparatus includes a first physical connector, a first electrical connector, a second physical connector, a second electrical connector, a storage area, and a UAV control unit. The first physical connector attaches the apparatus to a first UAV. The first electrical connector connects electricity between the apparatus and the first UAV. The second physical connector attaches the apparatus to a second UAV. The second electrical connector connects electricity between the apparatus and the second UAV. The storage area stores an energy source for the apparatus. The UAV control unit includes a processor and storage medium. The processor and storage medium are in communication with a cloud based network and receive instructions for the operation of the UAV, including steering instructions, through the cloud based network from a remote control device.

19 Claims, 4 Drawing Sheets

APPARATUS CONNECTING ROTARY BLADE UNMANNED AERIAL VEHICLES

TECHNICAL FIELD

The disclosure relates generally to the field of rotary blade unmanned aerial vehicles. Specifically, the disclosure relates to connecting a number of rotary blade unmanned aerial vehicles to form a single larger aerial vehicle.

BACKGROUND

Rotary blade unmanned aerial vehicles (UAVs) are often designed to carry a payload and/or to remain airborne for a specified duration of time. For example, a UAV such as a helicopter, a quad-copter, or an octo-copter may be designed to carry a payload of up to 10 pounds and remain airborne for up to 30 minutes. To carry a larger payload, the UAV typically has to be larger, with larger motors, larger propellers, more propellers, and/or larger power modules to generate the lifting force sufficient to carry the larger payload. Likewise, for extended flight duration, additional or larger power modules are often used.

BRIEF SUMMARY

An apparatus for connecting a number of UAVs is described. The apparatus includes a first physical connector, a first electrical connector, a second physical connector, a second electrical connector, a storage area, and a UAV control unit. The first physical connector attaches the apparatus to a first UAV. The first electrical connector connects electricity between the apparatus and the first UAV. The second physical connector attaches the apparatus to a second UAV. The second electrical connector connects electricity between the apparatus and the second UAV. The storage area stores an energy source for the apparatus. The UAV control unit includes a processor and a non-transitory storage medium. The non-transitory storage medium includes an energy control unit and a communication control unit. The energy control unit controls electrical energy to a connected UAV. The control unit controls communication between the first UAV and the second UAV. The processor and storage medium are in communication with a cloud based network and receive instructions for the operation of the UAV, including steering instructions, through the cloud based network from a remote control device.

BRIEF DESCRIPTION OF THE DRAWINGS

A more particular description of the invention briefly described above is made below by reference to specific examples. Several examples are depicted in drawings included with this application. An example is presented to illustrate, but not restrict, the invention.

DETAILED DESCRIPTION

Figure 1:
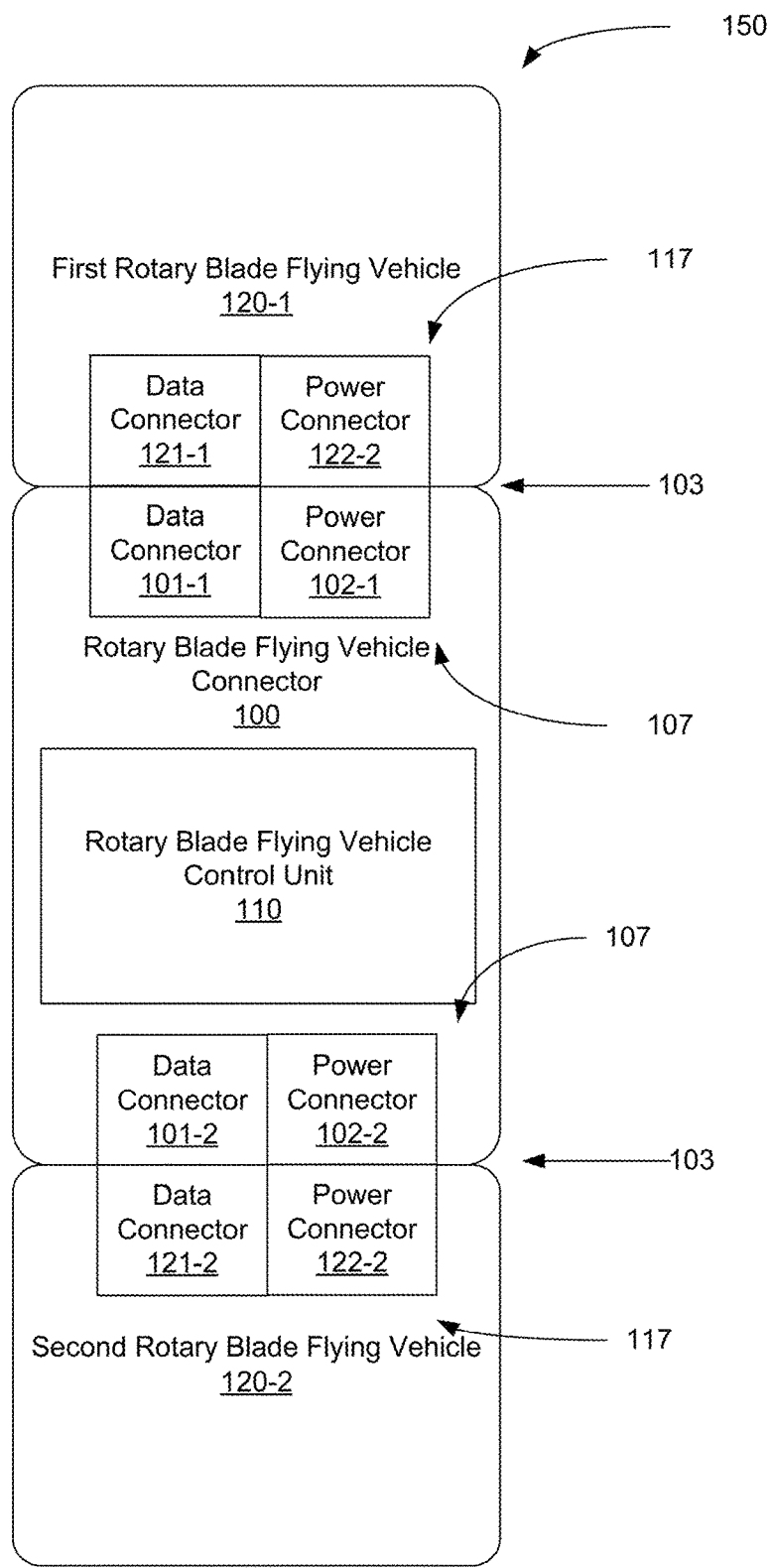
FIG. 1 illustrates an apparatus for connecting a number of UAVs.

A detailed description of the claimed invention is provided below by example, with reference to examples in the appended figures. Those of skill in the art will recognize that the components and steps of the invention as described by example in the figures below could be arranged and designed in a wide variety of different configurations without departing from the substance of the claimed invention. Thus, the detailed description of the examples in the figures is merely representative of examples of the invention, and is not intended to limit the scope of the invention as claimed.

For purposes of this disclosure, the modules refer to a combination of hardware and program instructions to perform a designated function. Each of the modules may include a processor and memory. The program instructions are stored in the memory, and cause the processor to execute the designated function of the modules. Additionally, a smartphone app and a corresponding computer system for the smartphone app may be used to control the UAVs.

A purpose of the claimed methods and apparatus is to facilitate the delivery of loads using UAVs. In one example, a number of UAVs are connected to increase the carrying capacity of the individual UAV. In a different example, a number of UAVs are connected to provide increased flight time for the UAVs.

For purposes of this disclosure as used in the present specification and in the appended claims, the term "load" refers to a thing or set of things that is carried by a UAV. A load may be used to ship goods in a retail transaction or may be used to privately distribute a good.

As used in the present specification and in the appended, the term transportation means moving an article from one location to another. Transportation may involve any means of propulsion using rotary blades to provide that transportation. Such force may include mechanical force, air currents, or electromagnetic currents.

As used in the present specification and in the appended, the term location means a particular place or position. A number of sensors may be used to determine a location, such as a global positioning system.

As used in the present specification and in the appended, the term sensor refers to a device that detects or measures a physical property and records, indicates, or otherwise responds to the detection or measurement.

As used in the present specification and in the appended, the term communication refers to the imparting or exchange of information.

As used in the present specification and in the appended, the term scale refers to an instrument that identifies the mass of an item, either directly as mass or as a measurement of that mass as the mass is subjected to gravitational force.

As described above, a myriad of problems complicate transportation of loads using UAVs. Some vehicles may be too small to carry a particular load. Some loads may be transported further than the range of the UAV. Additionally, attaching a number of UAVs to a single load may cause interference between the UAVs. One example of interference is that air flow between the rotary blades may cause irregularity and lift, resulting in difficulty controlling the transportation of the load. Additionally, when using a number of UAVs, a greater number of UAVs is required to transport a load, as where fewer UAVs are required when the load is not present. Hence, when a load is carried to a delivery point and the UAVs return unladen to the origination point, less lift or thrust is required to return the vehicles. In this example, a number of rotary blades may be disabled for the return trip.

Connecting a number of UAVs directly to each other may limit the shape, construction, and type of UAVs that may be used. Connecting a number of UAVs directly to each other may cause interference either with the flow of air or with radio signals to the UAVs. Additionally, directly connecting a number of UAVs to each other requires that each vehicle include the circuitry and logic to control other UAVs. This complexity increases the cost and difficulty in construction of UAVs that are used.

An apparatus for connecting UAVs, allowing a number of UAVs to function as a single unit, may increase the carrying capacity of the UAVs, with modules to handle the complexity of the interaction between the number of UAVs. The apparatus may allow for the battery of a secondary UAV to power a first UAV increasing the flight time of the combination of UAVs.

Referring now to the figures, FIG. 1 illustrates an apparatus for connecting UAVs, according to one example of the principles described herein, a UAV connector (100) connects a number of UAVs (120).

A first UAV (120-1) is mechanically connected to a UAV connector (100) using a physical connector (103). The physical connector includes an electrical connector (117). The electrical connector (117) includes a data connector (121-1) and a power connector (122-2). The data connector (121-1) communicates data between the first UAV (120-1) and the UAV connector (100). The power connector (122-2) connects power in the first UAV (120-1) to the UAV connector (100). The power connector (122-2) allows for electrical power to flow from the first UAV (120-1) to or from the UAV connector (100).

The UAV connector (110) has an electrical connection that includes a data connector (101-1) and a power connector (102-1). The data connector (101-1) in the UAV connector (100) connects to the data connector (121-1) in the first UAV (120-1). The power connector (102-1) in the UAV connector (100) connects to the power connector (122-2) in the first UAV (120-1). The electrical connector (117) provides for communication and power distribution between the first UAV (120-1) and the UAV connector (100).

The UAV connector (100) includes a number of electrical connectors (107) and physical connectors (103). An electrical connector (107) may be an integrated portion of a physical connector (103). The electrical connector (107) includes a data connector (101) and a power connector (102). The data connector allows for data communication between the UAV connector (100) and a UAV (120). The power connector (120) allows for the transmission of power between the UAV connector (100) and a UAV (120). The transmission of power allows for the UAV connector (100) to act as an external battery for a number of UAVs (100). Additionally, the UAV connector (100) may use battery capacity of a second UAV (120-2) to power a first UAV (120-1). The system is then allowed to transmit electrical energy from a source to a UAV (120) as the need or situation presents itself.

The UAV connector (100) includes a UAV control unit (110). The UAV control unit (110) monitors and modifies data from and to the number of UAVs (120). The UAV control unit (110) may modify, augment, create, or delete communication between UAVs (120). The UAV control unit (110) may include a number of sensors to supplement the data communicated between the UAVs (120). The UAV control unit (110) may control electrical energy between the UAVs (120) and the UAV connector (100). The UAV control unit (110) may use voltage or amperage in determining how to control the flow of electrical energy.

The second UAV (120-2) is connected to the UAV connector (100) in a similar fashion to the first UAV (120-1).

An overall example according to FIG. 1 will now be given. A first UAV (120-1) is connected to the UAV connector (100) to create a combined UAV (150). This connection includes a physical connection (103) and an electrical connection (107, 117). A second UAV (120-2) is connected to the UAV connector (100). Similarly, this connection includes a physical connection (103) and an electrical connection (107, 117). The UAV connector (100) provides for communication between the first UAV (120-1) and the second UAV (120-2). The UAV control unit (110) reads a number of sensors and monitors by communication with the first UAV (120-1) and the second UAV (120-2).

The combined UAV (150) is then attached to a load that is to be moved. In this example, the battery power of the first UAV (120-1) is lower than that of the second UAV (120-2). When the battery power of the first UAV (120-1) gets too low for the operation of the first UAV (120-1), the UAV control unit (110) causes electrical energy from the second UAV (120-2) to flow through the UAV connector (100) to the first UAV (120-1), allowing the combined UAV (150) to travel further than the battery life of the first UAV (120-1). This extended travel may allow for further delivery of the load or the return of the combined UAV (150) to its point of origin.

Figure 2:
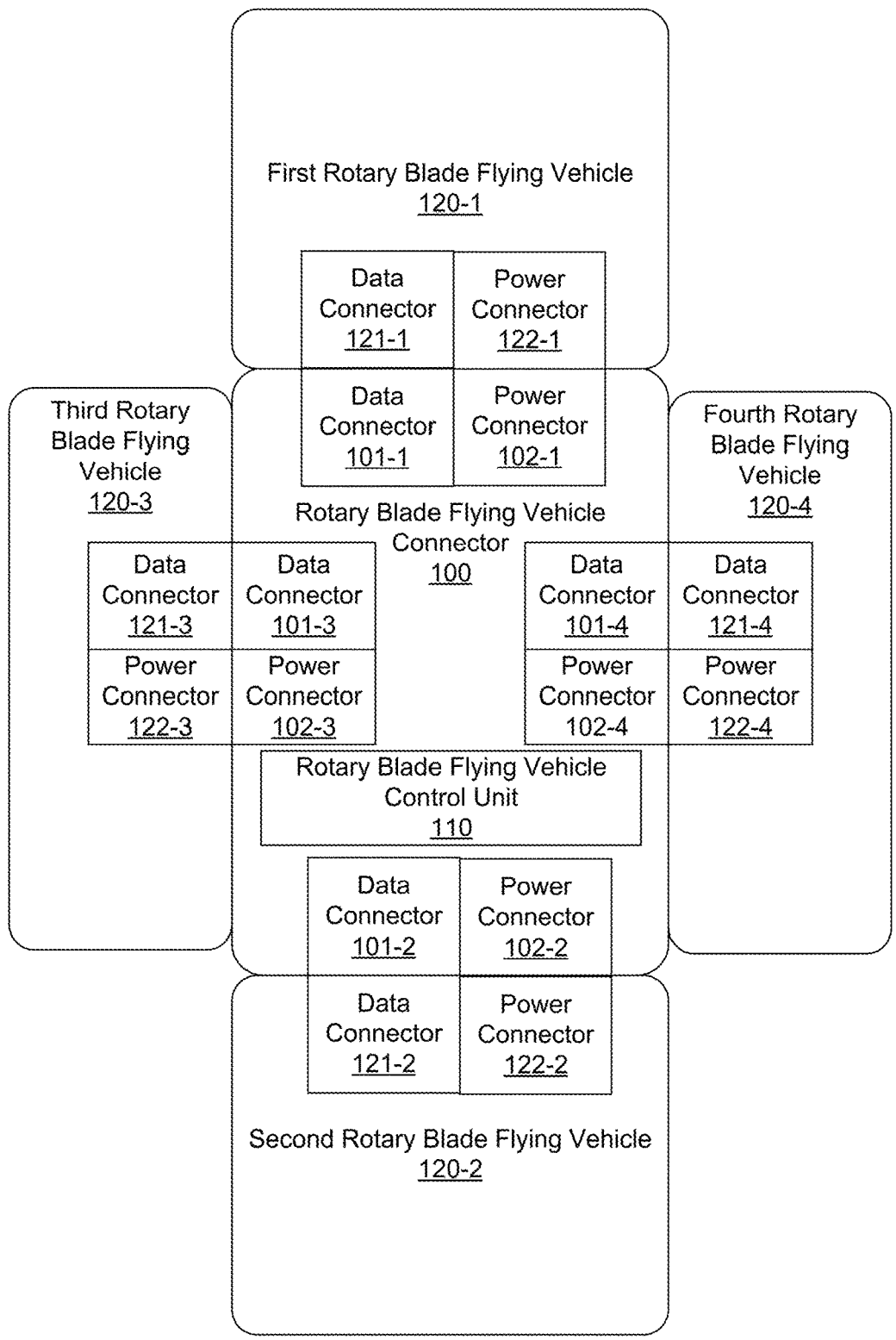
FIG. 2 illustrates an apparatus for connecting a plurality of UAVs.

FIG. 2 illustrates a number of UAVs (120) connected to a UAV connector (100). In this example, the UAV connector (100) connects four separate UAVs (120). The UAV connector (100) communicates with each of the UAVs (120). The UAV connector (100) may provide different communication between each UAV (120) based on measures from sensors including electrical power, weight, and reaction to the load based on thrust produced by each of the number of UAVs (120).

In this example, four UAVs (120) provide increased carrying capacity and distance for the delivery of a load.

Figure 3:
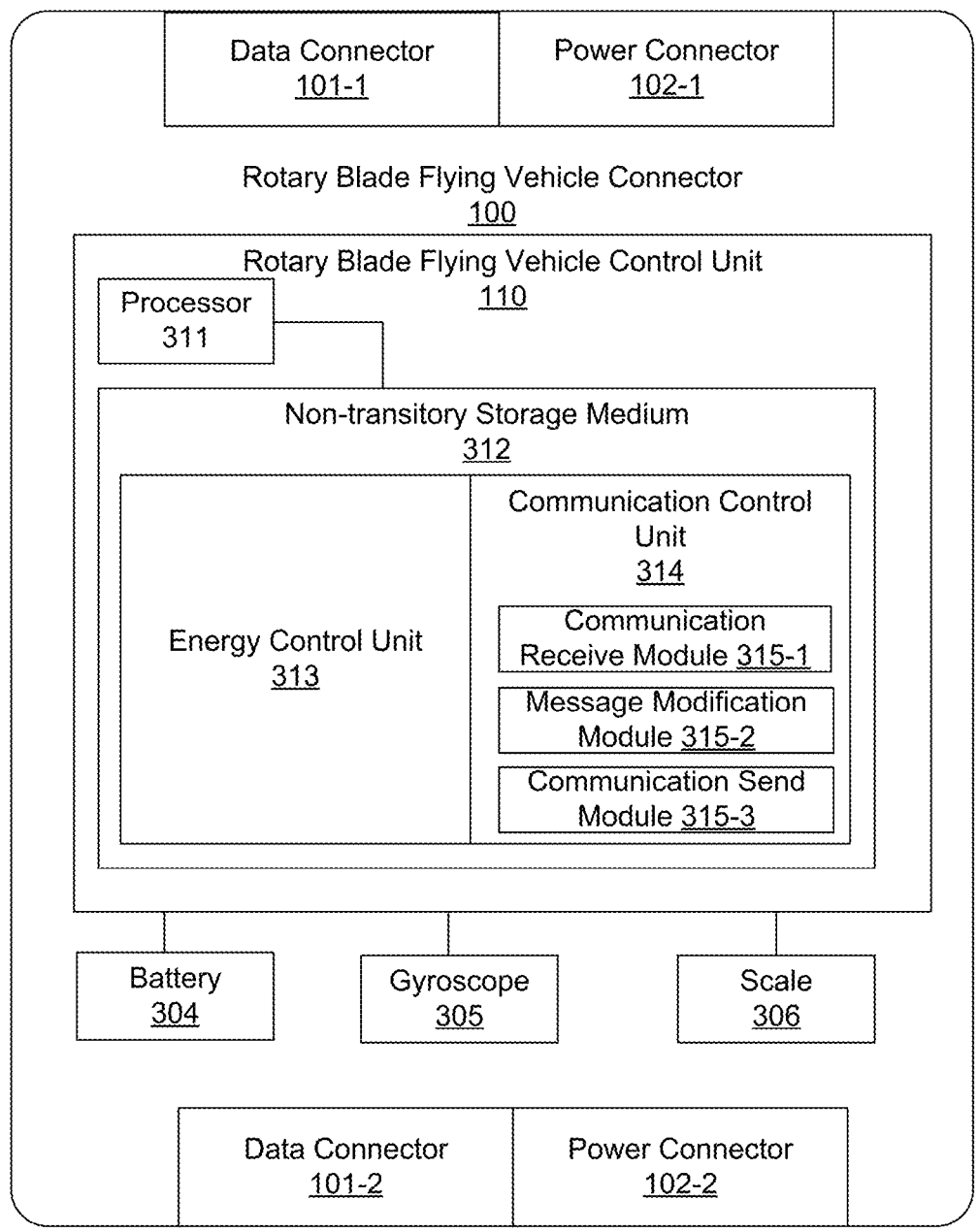
FIG. 3 illustrates an apparatus for connecting UAVs.

FIG. 3 illustrates a UAV connector (100) according to one example of the principles described herein. The UAV connector (100) includes a number of electrical connectors (107) to connect the UAV connector (100) to a number of UAVs (FIG. 1, 120). The electrical connector (107) in this example includes a data connector (101) and a power connector (102). The UAV connector (100) includes a UAV control unit (110). The UAV control unit (110) controls or modifies the behavior of connected UAVs (FIG. 1, 120). Further, the processor and storage medium may be in communication with a cloud based network and receive instructions for the operation of the UAV, including steering instructions, through the cloud based network from a remote control device.

In one example, the UAV connector (100) is subservient to the first UAV (FIG. 1, 120-1). The UAV connector (100) presents to the first UAV (FIG. 1, 120-1) the image that it is connected to one other UAV (FIG. 1, 120), even when a plurality of UAVs (FIG. 1, 120) are connected. In another example, all connected UAVs (FIG. 1, 120) are subservient to the UAV connector (100). In this example the UAV connector (100) may include a radio antenna and the ability to receive radio signals that direct the combined UAVs (FIG. 1, 150). And the processor and storage medium may be in communication with a cloud based network and receive instructions for the operation of the UAV, including steering instructions, through the cloud based network from a remote control device.

The UAV control unit (110) may include a processor (311), communicatively connected to a non-transitory storage medium (312). The UAV control unit (110) may be connected to a number of auxiliary systems or sensors such as a battery (304), a gyroscope (305), or a scale (305). The battery (304), gyroscope (305), or scale (306) may be a part of the UAV connector (100). The battery (304), gyroscope (305), or scale (306) may be part of a UAV (FIG. 1, 120). Each auxiliary system or sensor may be a single system, or may be a composition of a number of systems. For example, a gyroscope (305) may be a composite reading of a gyroscope on the UAV connector (100) and a number of gyroscopes associated with a number of UAV (FIG. 1, 120).

The non-transitory storage medium (312) includes an energy control unit (313) and a communication control unit (314). The energy control unit (313) controls the flow of electrical energy between each of the number of UAVs (FIG. 1, 120) and the UAV connector (100). The energy control unit (313) may be used to charge a battery (304) or to operate a number of UAVs (FIG. 1, 120).

The communication control unit (314) controls communication between the UAV connector (100) and a number of UAVs (FIG. 1, 120). The communication control unit includes a number of modules (315). Each module (315) may contain a combination of hardware and software to achieve the purpose of each individual module. In this example, the communication control unit (314) includes a communication receive module (315-1), a message modification module (315-2), and a communication send module (315-3).

The communication receive module (315-1) receives communication from a UAV (FIG. 1, 120). The communication may include commands to subservient UAV (FIG. 1, 120). The communication may include sensor data to be used by the UAV control unit (110).

The message modification module (315-2) modifies messages in preparation to send those messages to UAV (FIG. 1, 120). The message modification may include information about the battery (304), the gyroscope (305), or the scale (306). The message modification may include abstract information and dynamics about the interaction of various UAV (FIG. 1, 120). For example, the first UAV (FIG. 1, 120-1) may be unaware of the thrust characteristics of the second UAV (FIG. 1, 120-2). The UAV connector (100) may have data regarding the second UAV (FIG. 1, 120-2) or may detect changes based on its interaction with the second UAV (FIG. 1, 120-2). The UAV connector (100) may determine that the second UAV (FIG. 1, 120-2) provides decreased thrust and therefore is to be instructed to increase the speed of the rotary blades to match the thrust of the first UAV (FIG. 1, 120-1).

The communication send module (315-3) sends the modified communication to a UAV (FIG. 1, 120). The communication send module (315-3) may be aware of the underlying transport layer to the UAV (FIG. 1, 120).

In some examples, a UAV (FIG. 1, 120) may relay information to a secondary UAV connector (120). In other examples, a number of UAV connectors (100) may be connected to allow for a greater number of UAV (FIG. 1, 120). A UAV connector (100) may present as a single UAV (FIG. 1, 110), although it is a combined UAV (FIG. 1, 150).

Figure 4:
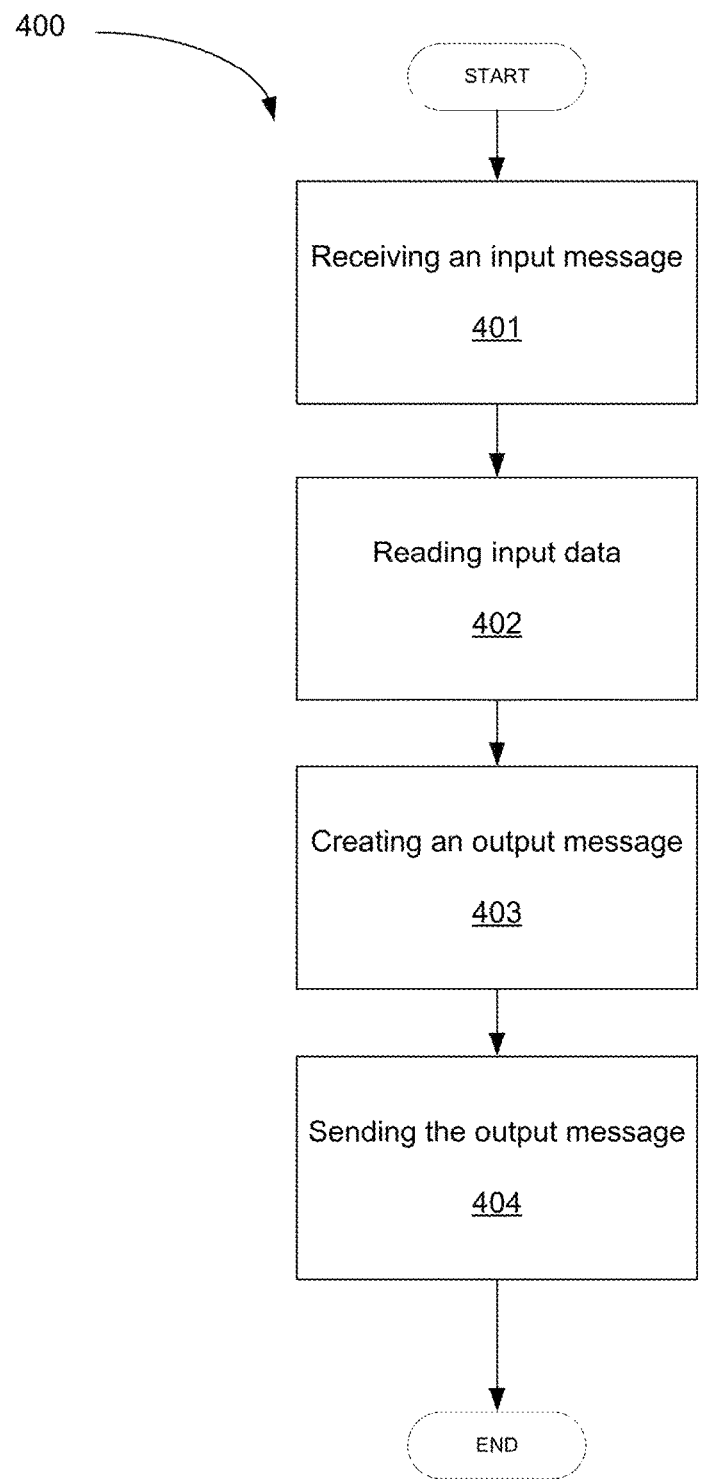
FIG. 4 illustrates a method for operating UAVs using an apparatus for connecting a number of UAVs.

FIG. 4 illustrates a method (400) for operating a number of UAVs using an apparatus for connecting a number of UAVs according to one example of the principles described herein. The method includes receiving (401) an input message, reading (402) input data, creating (403) an output message, and sending (404) the output message. The input data and output data may be through a cloud based network and comprise instructions for the operation of the UAV, including steering instructions, through the cloud based network from a remote control device.

The method (400) includes receiving (401), from a first UAV (FIG. 1, 120-1), an input message. The input message includes data to be shared with a number of subservient UAVs (FIG. 1, 120-2). The input message may include receiving, from the first UAV (FIG. 1, 120-1), electrical energy. The input message may be received using electrical energy.

The method (400) includes reading (402), from a number of sensors, input data. The input data indicates information about the apparatus for connecting a number of UAVs. The number of sensors may be associated with the first UAV (FIG. 1, 120-1). The number of sensors may be associated with a number of subservient UAVs (FIG. 1, 120). The sensors may be a combination of those associated with the first UAV (FIG. 1, 120-1), the subservient UAV (FIG. 1, 120), and the UAV connector (FIG. 1, 100)

The method (400) includes creating (403), based on the input message and the input data, an output message. The output message indicates control data to a number of controlled UAVs (FIG. 1, 120). The output message may be based on information regarding the subservient UAVs (FIG. 1, 120). This information may include the model and thrust characteristics of the subservient UAV (FIG. 1, 120). The input, output, and output message may be the result of communication through a cloud based network and include instructions for the operation of the UAV, including steering instructions, through the cloud based network from a remote control device.

The method (400) includes sending (404) the output message to the number of controlled UAVs (FIG. 1, 120). The output message may be sent to one subservient UAV (FIG. 1, 120). The output message may be sent to a number of subservient UAVs (FIG. 1, 120). The method (500) may create an output message for each subservient UAV (FIG. 1, 120).

An overall example according to FIG. 4 will now be given. The UAV connector (FIG. 1, 100) receives a message from a first UAV (FIG. 1, 120-1) indicating an amount of thrust that is needed from a second UAV (FIG. 1, 120-2). The message is to be shared with a second UAV (FIG. 1, 120-2)

The UAV connector (FIG. 1, 100) reads, from a number of sensors, gyroscope data and thrust data from the second UAV (FIG. 1, 120-2). The sensors are associated with the UAV connector (FIG. 1, 100), the first UAV (FIG. 1, 120-1), and the second UAV (FIG. 1, 120-2)

The UAV connector (FIG. 1, 100) creates an output message for the second UAV (FIG. 1, 120-2). The output message provides instructions to the second UAV (FIG. 1, 120-2) to operate the second UAV to allow the combined UAV (FIG. 1, 150) to operate efficiently.

The UAV connector (FIG. 1, 100) then sends the output message to the second UAV (FIG. 1, 120-2)

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

The invention claimed is:

1. An apparatus for connecting unmanned aerial vehicles (UAVs), the apparatus comprising:
a first physical connector, the first physical connector physically coupling the apparatus to a first UAV;

a first electrical connector, the first electrical connector electrically coupling the apparatus and the first UAV;

a second physical connector, the second physical connector physically coupling the apparatus to a second UAV;

a second electrical connector, the second electrical connector electrically coupling the apparatus and the second UAV;

a storage area, the storage area mechanically connected to the first physical connector and the second physical connector, the storage area storing an energy source for the apparatus; and a UAV control unit, the UAV control unit comprising:
   a processor; and
   a non-transitory storage medium comprising instructions that when executed by the processor, cause the processor to:
      control a flow of electrical energy between the apparatus and at least one of the first UAV and the second UAV; and
      control communication between the first UAV and the second UAV.

2. The apparatus of claim 1, further comprising a plurality of batteries wherein the UAV control unit uses the plurality of batteries to maintain electrical power to at least one of the first UAV and the second UAV.

3. The apparatus of claim 1, wherein the UAV control unit controls a flow of energy between the first UAV and the second UAV.

4. The apparatus of claim 1, wherein the instructions are further executable by the processor to:
   receive a message from the first UAV;
   modify the message received from the first UAV to create a modified communication; and
   send the modified communication to the second UAV.

5. The apparatus of claim 4, further comprising a gyroscope.

6. The apparatus of claim 5, wherein the message is modified based on input from the gyroscope.

7. The apparatus of claim 4, wherein the message is modified based on the flow of electricity between the first UAV and the second UAV.

8. The apparatus of claim 7, wherein the modified message comprises a replacement message.

9. The apparatus of claim 8, wherein the replacement message instructs the second UAV to stop spinning at least one rotary blade.

10. The apparatus of claim 4, further comprising a weight measurement device, the weight measurement device measuring a weight of a load being carried by the apparatus.

11. The apparatus of claim 10, wherein the the message is modified based on the weight measurement.

12. The method of claim 1, wherein the UAV controller is in communication with a cloud based network and wherein the UAV controller receives instructions for the operation of the first UAV and the second UAV, including steering instructions, through the cloud based network.

13. A method for operating unmanned aerial vehicles (UAVs), the method comprising:
   coupling a first UAV to a connector apparatus, the connector apparatus comprising a UAV controller;
   coupling a second UAV to the connector apparatus;
   receiving, at the UAV controller, an input message from the first UAV, the input message comprising data to be shared with the second UAV;
   reading, at the UAV controller, input data from a number of sensors, the input data indicating information about the connector apparatus;
   creating, at the UAV controller, based on the input message and the input data, an output message, the output message indicating control data for at least one of the first UAV and the second UAV; and
   sending, by the UAV controller, the output message to at least one of the first UAV and the second UAV.

14. The method of claim 13, further comprising receiving, by the UAV controller, a flow of electrical energy from the first UAV.

15. The method of claim 14, wherein the input data comprises a measurement of the electrical energy received from the first UAV.

16. The method of claim 13, wherein the input data comprises a measurement of electrical energy received from the second UAV.

17. The method of claim 14, wherein the input data comprises measurements of sensors associated with the second UAV.

18. The method of claim 13, wherein input data comprises measurements of sensors associated with the first UAV.

19. The method of claim 13, wherein the control data controls a number of rotary blades associated with at least one of the first UAV and the second UAV.

* * * * *